United States Patent [19]
Piejko et al.

[11] Patent Number: 5,250,617
[45] Date of Patent: Oct. 5, 1993

[54] POLYMER BLENDS CONTAINING ETHYLENE POLYMERS FOR FLEXIBLE FILMS

[75] Inventors: Karl-Erwin Piejko, Bergisch Gladbach; Hans Wunderlich, Leverkusen; Hans-Eberhard Braese; Christian Lindner, both of Cologne, all of Fed. Rep. of Germany

[73] Assignee: Bayer Aktiengesellschaft, Leverkusen, Fed. Rep. of Germany

[21] Appl. No.: 919,262

[22] Filed: Jul. 27, 1992

[30] Foreign Application Priority Data

Aug. 6, 1991 [DE] Fed. Rep. of Germany ....... 4125981

[51] Int. Cl.$^5$ ............. C08L 33/26; C08L 33/08; C08L 51/04; C08L 33/20
[52] U.S. Cl. ...................... 525/85; 525/80; 525/83; 525/86; 525/222; 525/227; 525/240
[58] Field of Search ............. 525/80, 83, 85, 86, 525/222, 227, 240

[56] References Cited

U.S. PATENT DOCUMENTS

| | | | |
|---|---|---|---|
| 4,902,744 | 2/1990 | Lindner et al. | 525/85 |
| 5,096,966 | 5/1992 | Piejko et al. | |
| 5,104,935 | 4/1992 | Leitz et al. | 525/67 |

FOREIGN PATENT DOCUMENTS

| | | |
|---|---|---|
| 0337187 | 10/1989 | European Pat. Off. . |
| 0370361 | 5/1990 | European Pat. Off. . |
| 0370362 | 5/1990 | European Pat. Off. . |
| 0373415 | 6/1990 | European Pat. Off. . |

*Primary Examiner*—James J. Seidleck
*Assistant Examiner*—W. R. H. Clark
*Attorney, Agent, or Firm*—Connolly & Hutz

[57] ABSTRACT

Polymer blends of
(a) graft polymers of vinyl monomers on an alkyl acrylate rubber
(b) a partly crosslinked acrylate-based copolymer rubber
(c) a resin-like copolymer
(d) an ethylene/vinyl acetate copolymer, a process for their production and their use as thermoplastic molding compounds.

2 Claims, No Drawings

POLYMER BLENDS CONTAINING ETHYLENE POLYMERS FOR FLEXIBLE FILMS

This invention relates to polymer blends of a special acrylate-based graft rubber, a special acrylate copolymer and selected ethylene copolymers which are suitable for the production of flexible ageing-resistant films having a leather-like appearance and which may be processed by calendering and thermoforming.

Plastic films of leather-like appearance are used, for example, for the interior trim of motor vehicles. They are generally produced by calendering of a crude film and subsequent thermoforming. The plastic used is generally polyvinyl chloride in admixture with various vinyl polymers and plasticizers. These films are not completely resistant to ageing at high temperatures and contain volatile constituents with a tendency to migrate and halogen on account of their polyvinyl chloride content. Accordingly, there is a need for a plastic material which is free from polyvinyl chloride (PVC) and which is suitable for the production of leather-like films.

The present invention relates to polymer blends of
(a) 10 to 60 parts by weight and, more particularly, 20 to 50 parts by weight of a graft polymer of
  (a.1) mixtures of 20 to 40% by weight acrylonitrile and 80 to 60% by weight styrene, styrene derivatives, alkyl methacrylates and mixtures thereof or
  (a.2) methyl methacrylate, optionally mixed with up to 30% by weight and preferably 2 to 20% by weight styrene (or derivatives) and/or 0 to 30% by weight and preferably 2 to 20% by weight alkyl acrylates and/or 0 to 19% by weight and preferably 2 to 15% by weight acrylonitrile on
  (a.3) a particulate highly crosslinked alkyl acrylate rubber which may contain 0 to 30% by weight and preferably 0.5 to 10% by weight copolymerized dienes and which has an average particle diameter ($d_{50}$) of 80 to 1,000 nm, the graft polymers (a) having rubber contents of 30 to 80% by weight, preferably 45 to 65% by weight and, more preferably, 50 to 60% by weight,
(b) 10 to 50 parts by weight and, more particularly, 10 to 40 parts by weight of a partly crosslinked rubber-like copolymer of 5 to 40% by weight, preferably 10 to 35% by weight and, more preferably, 25 to 35% by weight acrylonitrile, styrene, alkyl methacrylate or mixtures thereof and 95 to 60% by weight, preferably 90 to 65% by weight and, more preferably, 75 to 65% by weight alkyl acrylate with a gel content of 20 to 99% by weight and an average particle diameter ($d_{50}$) of 100 to 600 nm and, more particularly, 100 to 300 nm,
(c) optionally 5 to 40 parts by weight and preferably 10 to 30 parts by weight vinyl polymer, i.e. an uncrosslinked polymer of styrenes, acrylonitrile, methacrylonitrile, esters of (meth)acrylic acid or mixtures of these monomers having intrinsic viscosities [$\eta$] (as measured in dimethyl formamide at 23° C.) of 0.3 to 1.5 dl/g and
(d) 1 to 40 parts by weight, more particularly 2 to 30 parts by weight and preferably 4 to 20 parts by weight of an ethylene/vinyl acetate copolymer having vinyl acetate contents of 25 to 75% by weight and, more particularly, 50 to 70% by weight.

The films produced from the blends according to the invention are resistant to ageing, even at high temperatures. They have an extremely favorable low melt viscosity, expressed for example as the so-called MVI, so that the processing rates during thermoplastic processing are increased. These favorable rheological properties reduce the tendency towards malfunctions during production of the films. The mechanical properties of the films, such as their tensile strength and elongation at break, are not affected despite the favorable melt flow. Depending on the quantity of the ethylene copolymers d), the melt viscosity of the molding compounds is variable within wide limits without any deterioration in important performance properties of the films produced therefrom.

Graft polymers a) in the context of the invention are generally emulsion polymers having a particulate structure. They are formed from particulate alkyl acrylate rubbers having a gel content of greater than 50% and preferably from 70 to 99% and average particle diameters ($d_{50}$) of 80 to 1,000 nm as the graft base (a.3) and monomers graft-polymerized thereon, such as alkyl acrylates, alkyl methacrylates, styrenes, such as styrene, o-methyl styrene, p-methyl styrene, acrylonitrile or mixtures thereof (a.1 and a.2).

The alkyl acrylate rubbers are produced by crosslinking copolymerization of, preferably, $C_{2-8}$ alkyl acrylates and optionally up to 20% by weight comonomers, such as styrene, methyl methacrylate, vinyl methyl ether and/or acrylonitrile, and up to 4% by weight polyfunctional vinyl and/or allyl monomers, such as divinyl benzene, glycol bisacrylate, bisacrylamide, phosphoric acid triallyl ester, citric acid triallyl ester, triallyl cyanurate, triallyl isocyanurate, allyl esters of acrylic or methacrylic acid, maleic acid allyl ester, more particularly triallyl cyanurate or triallyl isocyanurate. Acrylate rubbers preferred as graft bases have a biomodal distribution of the average particle diameters. Accordingly, they are preferably mixtures of two particulate rubbers of which one has an average particle diameter ($d_{50}$) of 150 to 250 nm (fine-particle) while the other has an average particle diameter ($d_{50}$) of 400 to 600 nm (coarse-particle). The ratio by weight of the fine-particle rubber to the coarse-particle rubber is 1:2 to 2:1. Accordingly, there are two maxima in the distribution curve of the average particle diameters of a mixture of the two rubbers which can have the same or different chemical structures.

Particularly suitable coarse-particle rubbers have a core/shell) structure (cf. DE-OS 3 006 804).

Accordingly, particularly preferred graft bases in the context of the invention for the production of the graft polymers a) are mixtures of relatively coarse rubber particles having a core/shell structure and relatively small rubber particles without a core/shell structure. The rubber particles used for the graft polymerization are crosslinked and have gel contents of 50 to 99% by weight and preferably 70 to 99% by weight. To produce component (a), the vinyl monomers are graft-polymerized onto the acrylate rubbers present in emulsion, the emulsion remaining intact. Styrene and acrylonitrile are preferably used as the vinyl monomers.

The vinyl monomers (a.1 and a.2) are preferably polymerized onto the graft base in a graft yield of more than 40% by weight, i.e. a large percentage of the vinyl monomers is chemically bound to the rubber (by covalent bonds). Graft yields as high as these are obtained where redox initiators are used in known manner, preferably combinations of hydroperoxide and ascorbic acid, optionally with addition of suitable heavy metal cations.

The copolymers (b) according to the invention are partly crosslinked rubber-like copolymers based on acrylonitrile, styrene, $C_{1-6}$ alkyl methacrylate, more particularly $C_{1-3}$ alkyl methacrylate, or mixtures thereof, preferably based on acrylonitrile and/or methyl methacrylate and an alkyl acrylate, more particularly $C_{3-8}$ alkyl acrylate, and 0.05 to 5% by weight, based on the monomers present in the copolymer, of a polyfunctional copolymerizable polyvinyl or allyl compound, preferably triallyl cyanurate, triallyl isocyanurate, vinyl ethers of polyols, vinyl or alkyl esters of polyfunctional carboxylic acids and bis-acrylamides of diamines. The copolymers b) have gel contents of 20 to 99% by weight and preferably 40 to 99% by weight, a swelling index of greater than 10 and preferably 10 to 100, as measured in dimethyl formamide at 23° C., and average particle diameters ($d_{50}$) of 100 to 600 nm and, more particularly, 100 to 300 nm.

The copolymers (b) may be prepared in known manner by radical aqueous emulsion polymerization in the presence of anionic surfactants at temperatures of 40° to 95° C. and, more particularly, 55° to 80° C.

Vinyl polymers c) according to the invention are resin-like polymers or copolymers of styrenes, such as styrene, α-methyl styrene, p-methyl styrene, acrylonitrile, methacrylonitrile, esters of (meth)acrylic acid or mixtures of the above-mentioned monomers having intrinsic viscosities [η] as a measure of their molecular weight (as measured in dimethyl formamide at 23° C.) of 0.3 to 1.5 dl/g. Copolymers of styrene or α-methyl styrene with acrylonitrile optionally containing up to 40% by weight esters of (meth)acrylic acid, more particularly methyl methacrylate or butyl acrylate, are preferred.

The vinyl polymers (c) are obtained by standard methods, for example radical polymerization in bulk, solution, suspension or emulsion, and preferably by radical emulsion polymerization in water.

The ethylene polymers (d) are rubber-like, uncrosslinked polymers, i.e. polymers soluble in organic solvents, and consist of 75 to 25% by weight ethylene and 25 to 75% by weight vinyl acetate.

Polymers (d) having vinyl acetate contents of 40 to 70% by weight are preferred. The polymers are normally produced by radical emulsion or solution polymerization. The ethylene polymers d) are known and are standard rubbers or constituents of thermoplastic molding compounds, such as polyvinyl chloride.

The polymer blend of components (a) to (d) according to the invention may be prepared, for example, as follows:

Where components (a) to (c) accumulate in the form of an aqueous dispersion (latex), they may be mixed in quantities corresponding to the desired solids composition and may be worked up together, for example to a powder The powder may optionally be compacted to granules with addition of conventional auxiliaries.

Component (d) is combined with the mixture of a) to c) in known units, such as screw extruders, mixing rolls, kneaders or powder mixers.

Components (a) to (c) may even be individually worked up and then mixed with component (d).

Unless otherwise stated, gel contents and swelling indices were determined in dimethyl formamide at 23° C. (cf. M. Hoffmann et al., Polymeranalytik II, Georg-Thieme-Verlag, Stuttgart, 1977). The particle diameters are average particle diameters $d_{50}$ (see "Ultrazentrifugenmessungen", W. Scholtan et al., Kolloidz. und A. Polymere 250 (1972), pages 783–796).

The graft yield is the ratio by weight of the graft-polymerized resin-forming monomers to the total quantity of resin-forming monomers used.

EXAMPLE

Graft polymers a

Production of the acrylate rubber graft base 17,232 parts by weight water and 588 parts by weight of a polybutadiene rubber latex having a polymer solids content of 42% by weight and an average particle diameter ($d_{50}$) of 140 nm are introduced into a reactor. After heating to 63° C., a solution of 49.2 parts by weight potassium peroxodisulfate and 1,152 parts by weight water is added. The following mixtures are then simultaneously introduced into the reactor over a period of 5 h at 63° C.:

| Solution 1: | 36,000 parts by weight n-butyl acrylate |
| --- | --- |
| | 81.6 parts by weight triallyl cyanurate |
| Solution 2: | 40,800 parts by weight water |
| | 384 parts by weight $C_{14-18}$ alkyl sulfonic acid Na salt. |

The mixture is then left to polymerize for 4 h at 63° C. An emulsion having a polymer solids content of 37% by weight is obtained. The average latex particle diameter ($d_{50}$) is 480 nm. The polymer has a gel content of 93% by weight.

Production of the graft polymer

734 Parts by weight water and 4,784 parts by weight latex of the acrylate rubber graft base are introduced into a reactor. After purging with nitrogen for 30 minutes, the contents of the reactor are heated to 70° C. Solution 1 is then added with stirring:

| Solution 1: | 190 parts by weight water |
| --- | --- |
| | 6 parts by weight potassium peroxodisulfate |
| | 3 parts by weight $C_{14-18}$ alkyl sulfonic acid Na salt |

Solutions 2 and 3 are then simultaneously introduced into the reactor over a period of 5 h at 70° C.

| Solution 2: | 850 parts by weight styrene |
| --- | --- |
| | 330 parts by weight acrylonitrile |
| Solution 3: | 1,500 parts by weight water |
| | 20 parts by weight $C_{14-18}$ alkyl sulfonic acid Na salt. |

The mixture is left to polymerize for 4 h at 70° C. An emulsion having a polymer solids content of 35% by weight is obtained. The polymer has a rubber content of 60% by weight.

Copolymers (b)

Production of the acrylonitrile/n-butyl acrylate copolymer

A solution of 2.5 parts by weight of the Na salt of $C_{14-18}$ alkyl sulfonic acids and 750 parts by weight water is introduced with stirring into a reactor. After heating to 70° C., 70 parts by weight of monomer solution (A) are added and the polymerization is initiated by addition of a solution of 3.5 parts by weight potassium peroxodisulfate in 50 parts by weight water. The rest of solution A) and solution (B) are uniformly introduced into the reactor over a period of 6 h at 70° C. and the mixture is polymerized over a period of 4 h. A latex having a polymer solids content of 38% by weight, an average particle diameter ($d_{50}$) of 180 nm and a gel content (in dimethyl formamide at 23° C.) of 98% by weight is obtained.

| Solution A: | 1,105 parts by weight | n-butyl acrylate |
|---|---|---|
|  | 7 parts by weight | triallyl cyanurate |
|  | 474 parts by weight | acrylonitrile |
| Solution B: | 30 parts by weight | Na salt of $C_{14-18}$ alkyl sulfonic acids |
|  | 1,790 parts by weight | water. |

Vinyl polymers (c)

Production of the styrene/acrylonitrile copolymer

A solution of 6 parts by weight disproportionated abietic acid and 4 parts by weight 1N sodium hydroxide in 3,080 parts by weight water is introduced into a reactor, purged with nitrogen and heated to 70° C. 200 Parts by weight solution A) are then added with stirring and the polymerization is initiated by addition of a solution of 8 parts by weight potassium peroxodisulfate in 200 parts by weight water. The rest of solution A) and solution B) are uniformly introduced into the reactor over a period of 5 h at 70° C.

The mixture is left to polymerize for 4 h at 70° C. An emulsion having a polymer solids content of 33% by weight is obtained. The isolated polymer has an intrinsic viscosity [$\eta$] of 0.7 dl/g (in dimethyl formamide at 23° C.

| Solution A: | 1,944 parts by weight | styrene |
|---|---|---|
|  | 756 parts by weight | acrylonitrile |
|  | 2.6 parts by weight | tert. dodecyl mercaptan |
| Solution B: | 54 parts by weight | disproportionated abietic acid |
|  | 40 parts by weight | 1 N sodium hydroxide |
|  | 2,050 parts by weight | water. |

Ethylene copolymers (d)

A solution copolymer of 70% by weight vinyl acetate and 30% by weight ethylene having average molecular weights of 200,000 g/mol was used as the ethylene copolymer.

Polycaprolactone (e)

(for comparison purposes)

Poly-ε-caprolactone having a $\eta_{rel}$ value (as measured in $CH_2Cl_2$ at 20° C. in a 2% by weight solution) of 3.0.

Production and properties of the polymer blends

To produce the polymer blends, the latices of constituents (a), (b) and (c) are mixed in such a way that the solid components give the compositions of the polymer blends shown in Table 1. 1% by weight (based on solids) of a phenolic stabilizer is added to the latex mixtures which are then coagulated with aqueous magnesium sulfate solution. The powders initially obtained are filtered off, washed and dried at 60° C. The powders are homogenized with constituent (d) corresponding to Table 1 and 0.4% by weight ester wax on mixing rolls for 10 minutes at 190° C. and then press-molded at 200° C. to form test specimens. The properties of the test specimens and molding compounds are listed in Table 2.

TABLE 1

| Example No. | Composition of the polymer blends Constituents |  |  |  |  | |
|---|---|---|---|---|---|---|
|  | a | b | c | d | e | |
| 1 | 45 | 40 | 15 | — | — | Comparison |
| 2 | 42.75 | 38 | 14.25 | 5 | — | |
| 3 | 40.5 | 36 | 13.5 | 10 | — | |
| 4 | 36 | 32 | 12 | 20 | — | |
| 5 | 31.5 | 28 | 10.5 | 30 | — | |
| 6 | 27 | 24 | 9 | 40 | — | |
| 7 | 22.5 | 20 | 5 | 50 | — | Comparison |
| 8 | 42.75 | 38 | 14.25 | — | 5 | Comparison |

Test methods:
Tensile strength: DIN 53 455
Elongation: DIN 53 455
Shore hardness: DIN 53 505/type A/D
Melt viscosity (MVI): DIN 53 735 (220°/21.6 kg)

TABLE 2

Properties of the molding compounds

| Example No. | MVI | Tensile strength [MPa] | Elongation [%] | Shore hardness A/B | Vicat method A [°C.] |
|---|---|---|---|---|---|
| 1 (Comparison) | 0.5 | 18 | 210 | 95/39 | 84 |
| 2 | 6 | 15 | 200 | 95/37 | 71 |
| 3 | 15 | 14.3 | 210 | 92/35 | 64 |
| 4 | 58 | 11.8 | 200 | 91/29 | 47 |
| 5 | 171 | 7 | 160 | 84/23 | 40 |
| 6 | 449 | 5 | 160 | 77/17 | 36 |
| 7 (Comparison) | Too soft | | | | |
| 8 (Comparison) | 8 | 16 | 220 | 94/39 | 57 |

Table 2 shows that the addition of component (d), even in small quantities, to (a), (b) and (c) increases the melt viscosity index without significantly affecting the other properties. Although the addition of polycaprolactone as plasticizer also increases the melt viscosity index, it causes a drastic reduction in the Vicat temperature (Comparison Example 8), even in small quantities. The addition of component (d) in large quantities (>20%), in addition to dramatically increasing the MVI value, softens the molding compounds and distinctly reduces the Vicat temperature. With percentage contents of component (d) of greater than 40% (Comparison Example 7: 50%), the molding compounds are too soft for film applications.

We claim:
1. Polymer blends of
   (a) 10 to 60 parts by weight of a graft polymer of
      (a.1) mixtures of 20 to 40% by weight acrylonitrile and 80 to 60% by weight styrene, styrene, alpha methyl styrene, para methyl styrene, alkyl methacrylates or mixtures thereof or
      (a.2) methyl methacrylate, optionally mixed with 0 to 30% by weight styrene and/or 0 to 30% by weight alkyl acrylates and/or 0 to 19% by weight acrylonitrile on
      (a.3) a particulate highly crosslinked alkyl acrylate rubber which may contain 0 to 30% by weight copolymerized dienes and which has an average particle diameter ($d_{50}$) of 80 to 1,000 nm, the graft polymers (a) having rubber contents of 30 to 80% by weight;

(b) 10 to 50 parts by weight of a partly crosslinked rubber-like copolymer of 5 to 40% by weight acrylonitrile, styrene, alkyl methacrylate or mixtures thereof and 95 to 60% by weight alkyl acrylate with a gel content of 20 to 99% by weight and an average particle diameter ($d_{50}$) of 100 to 600 nm and, (c) optionally 5 to 40 parts by weight vinyl polymer comprising an uncrosslinked polymer of alpha methyl styrene, para methyl styrene, acrylonitrile, methacrylonitrile, esters of (meth)acrylic acid or mixtures of these monomers having intrinsic viscosities [$\eta$] (as measured in dimethyl formamide at 23° C.) of 0.3 to 1.5 dl/g and (d) 1 to 40 parts by weight of an ethylene/vinyl acetate copolymer having vinyl acetate contents of 25 to 75% by weight.

2. A thermoformable flexible film comprising the polymer blend of claim 1.

* * * * *